May 10, 1927.
P. E. HUNTER
1,628,245
METHOD OF AND APPARATUS FOR WELDING
Filed April 2, 1923 4 Sheets-Sheet 1
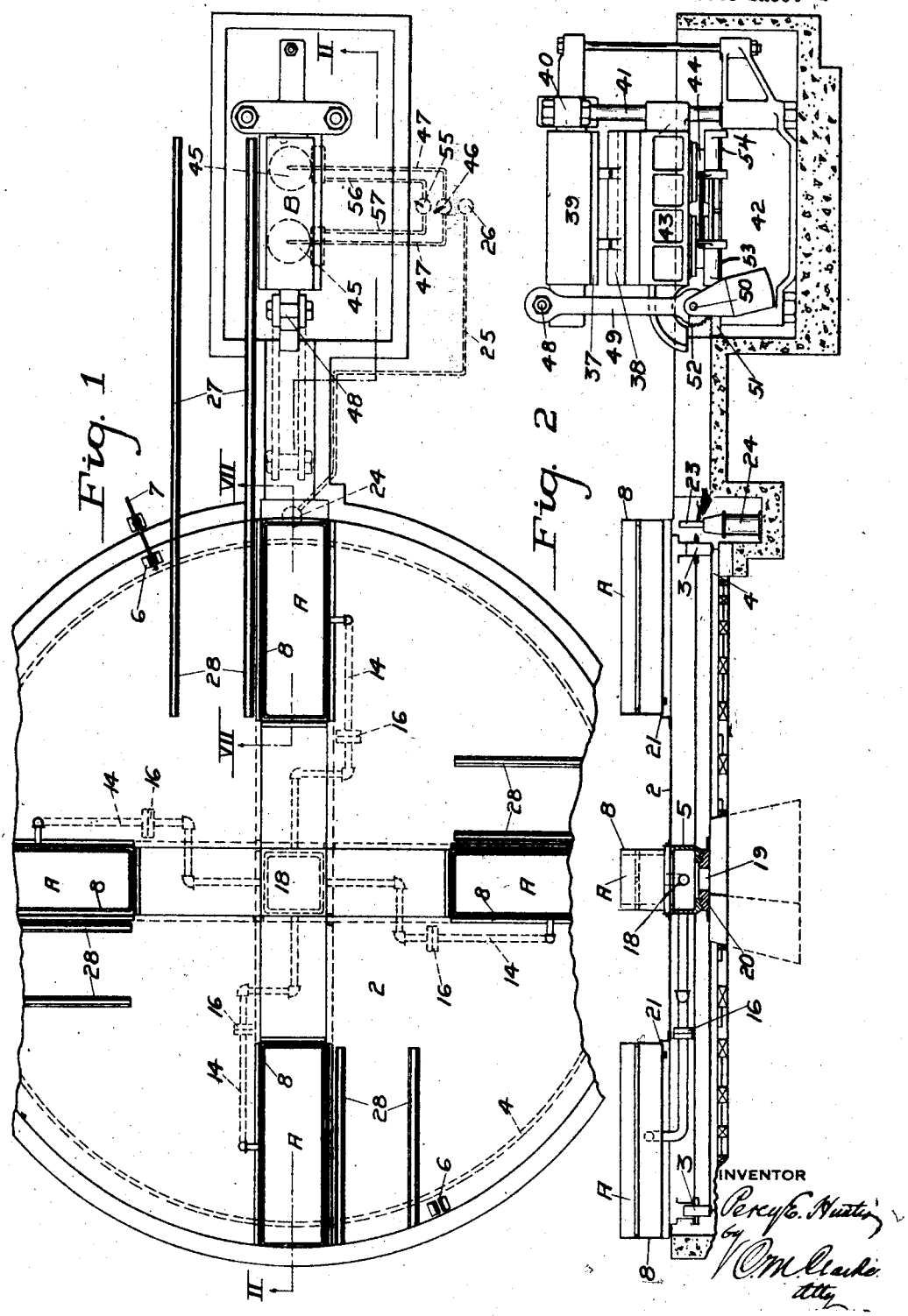

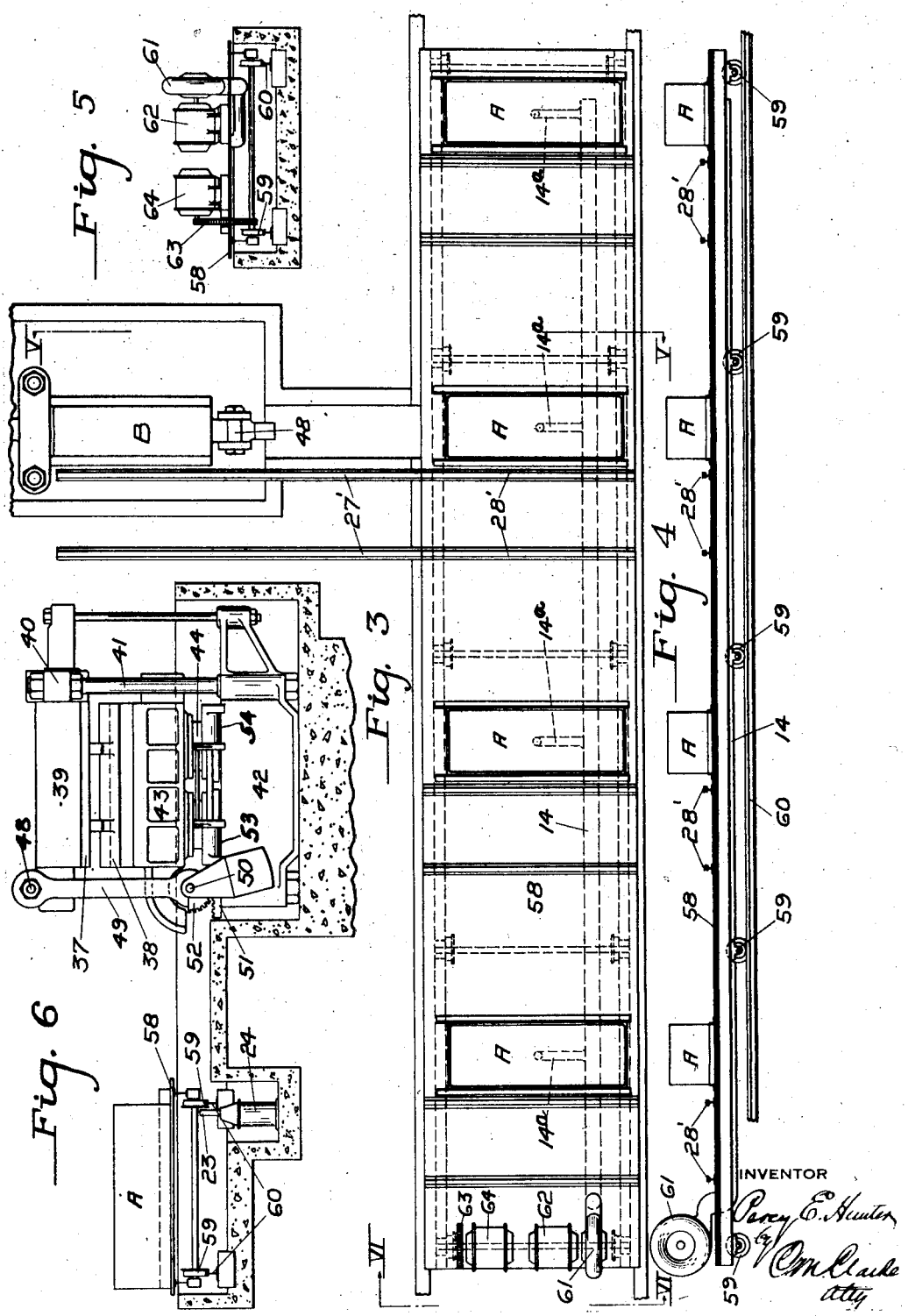

May 10, 1927.
P. E. HUNTER
1,628,245
METHOD OF AND APPARATUS FOR WELDING
Filed April 2, 1923    4 Sheets-Sheet 3
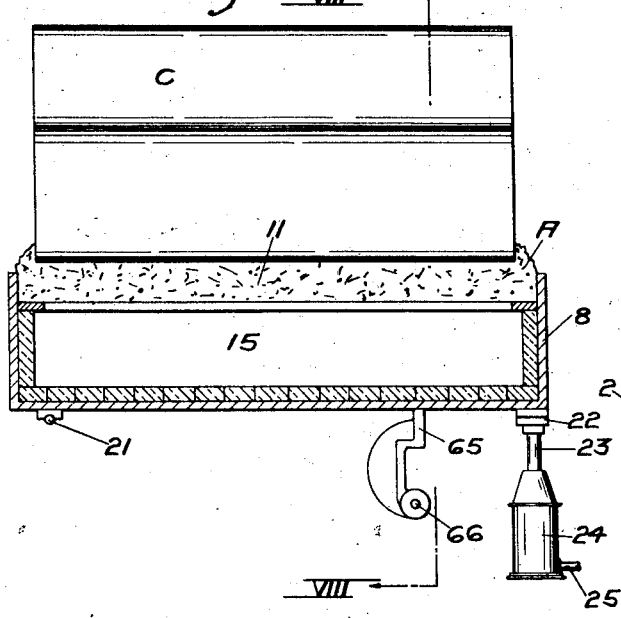
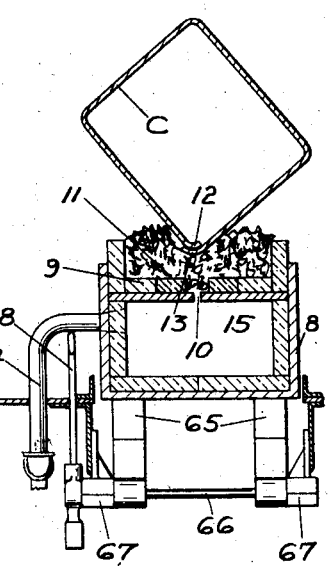
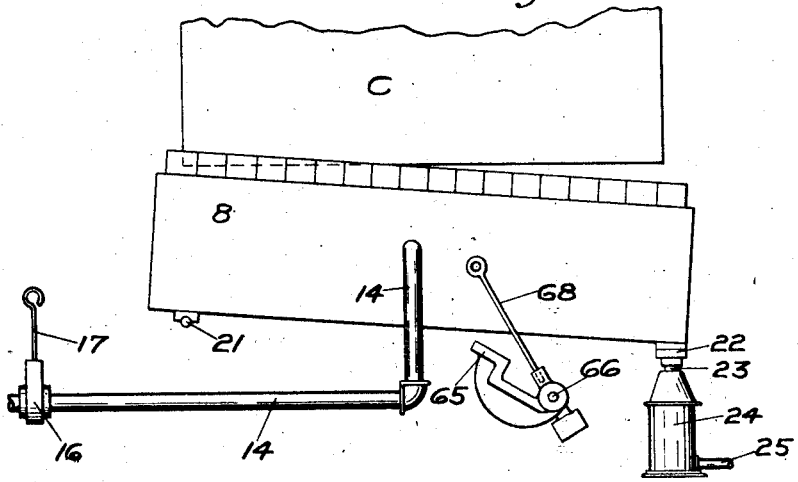
INVENTOR May 10, 1927.
P. E. HUNTER
1,628,245
METHOD OF AND APPARATUS FOR WELDING
Filed April 2, 1923    4 Sheets-Sheet 4
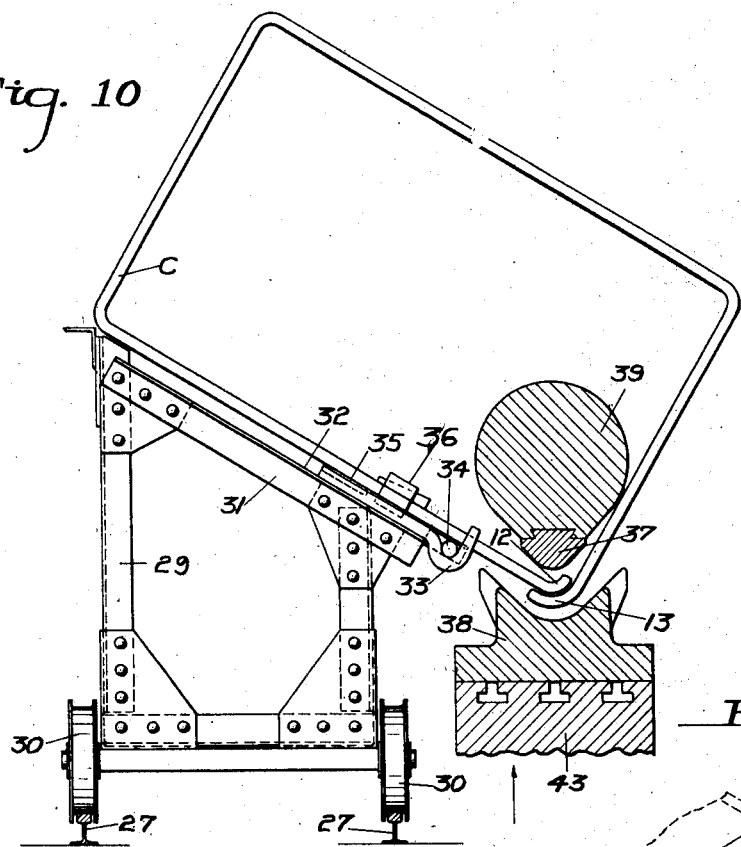
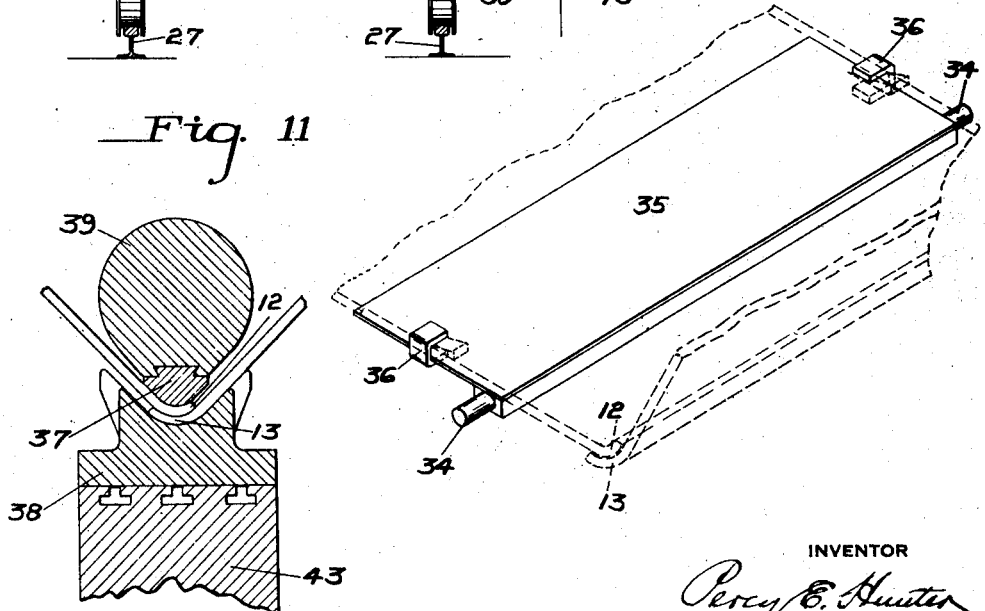
INVENTOR
Percy E. Hunter
by O. M. Peacke
atty Patented May 10, 1927.

1,628,245

UNITED STATES PATENT OFFICE.

PERCY E. HUNTER, OF PITTSBURGH, PENNSYLVANIA, ASSIGNOR TO PITTSBURGH ANNEALING BOX COMPANY, OF PITTSBURGH, PENNSYLVANIA, A CORPORATION OF PENNSYLVANIA.

METHOD OF AND APPARATUS FOR WELDING.

Application filed April 2, 1923. Serial No. 629,256.

My invention is an improvement in the art of welding metal, and is particularly designed to provide means for heating the article to be welded and then subjecting it to welding pressure with a minimum loss of time.

It has in view to provide means for subjecting the blank, or portions to be welded, to the heat of a furnace; then quickly moving the heated blank from the furnace to a welding machine; and then subjecting it therein to welding pressure or other formative treatment, utilizing mechanism for supporting the blank over the furnace and for shifting the blank, manipulating the welding or treating machine, etc., as shall be more fully hereinafter described.

In the accompanying drawings, I have illustrated certain constructions of apparatus for carrying out my invention, utilizing a plurality of furnaces and a carrying platform capable of being intermittently shifted, in which:

Fig. 1 is a general plan view of the turntable and furnaces, showing the arrangement with relation to the welding machine;

Fig. 2 is a central longitudinal section therethrough, on the line II—II of Fig. 1;

Fig. 3 is a view similar to Fig. 1, but showing a reciprocable furnace supporting platform associated with the welding machine;

Fig. 4 is a view of the platform in side elevation;

Figs. 5 and 6 are cross sectional views on the lines V—V and VI—VI of Fig. 3;

Fig. 7 is a longitudinal sectional view through one of the furnaces on the line VII—VII of Fig. 1;

Fig. 8 is a cross section on the line VIII—VIII of Fig. 7;

Fig. 9 is a view in side elevation, showing the furnace lowered for shifting of the heated blank;

Fig. 10 is an enlarged cross sectional view through a portion of the welding machine, showing the article to be welded located by its supporting buggy in position between the dies;

Fig. 11 is a partial similar view, showing the welding dies in compression; and

Fig. 12 is a perspective detail view, showing the temporary supporting bracket for the blank.

While the invention is not necessarily limited to the utilization of a plurality of serving furnaces on a single carrier or frame, I have secured excellent results with an intermittently operable table provided with a number of successively charged and successively delivering furnaces, as shown herein.

Referring to the drawings, Figs. 1 and 2, a series of open top heating furnaces A are mounted in radial arrangement and at preferably equi-distant spaces around the outermost portion of a supporting turntable 2. The turntable, which may be of any suitable construction, is mounted by wheels 3 on a circular track 4 with a suitable center bearing 5. It is intermittently turned by any suitable means, as gearing, a cable, or by hand. The turntable is preferably provided with a series of stop abutments or sockets 6 adapted to be engaged by a locking bolt or crank operated lever 7 or the like, to ensure bringing the furnace and its service tracks into proper alinement with the welding machine B.

Each furnace A is adapted to support combustion at its upper open portion for quickly and evenly heating the meeting edges of the blank to be welded, and is also adjustable vertically, whereby to be dropped for easy clearance of the heated articles away from the fire, longitudinally of the furnace, as in Fig. 9.

To this end, it consists of a box-like frame 8 of sheet or plate metal with a refractory supporting bottom 9 at each side of a central longitudinal air supply slot 10 for the fuel bed 11. The latter, of coke, or other suitable fuel in combustion, is arranged at each side along the center for adaptation and application of the heat to the blank.

In the particular application illustrated, the blank C is in the form of a rectangular box, suitable for making the side and end walls of an annealing box, or the like, in which the previously bent terminal edges 12, 13, are rounded and loosely overlap in approximately the position for final welding. The opposite side members are preferably clamped together by a suitable holding device, as a turnbuckle, with double hooked terminals, or the like, not necessarily shown, to temporarily hold the joint members in proper relation.

The furnace A is supplied with air throughout its length by an air pipe 14 arranged to deliver air to the open lower air box 15, below the middle slot 10. The pipe is sufficiently flexible to provide for up and down movement of the furnace. A suitable damper valve 16 with its necessary operating handle 17 is provided in each line 14 to control the air supply.

Each branch pipe 14 connects with a central air box 18 incorporated in the central bearing portion of the turntable, to which air is supplied through a central hole 19 in the bearing pedestal 20 from a blower or the like, as will be readily understood.

Each furnace A is pivotally mounted at its inner end on a trunnion or pivot support 21 suitably carried by the turntable, and rests by its forward end on a shoe 22, on the upper end of a plunger 23 of fluid cylinder 24. Said cylinder is provided with a pressure and exhaust line 25 leading to three-way valve 26, by which the plunger is raised and lowered, to raise and lower the outer portion of the furnace with relation to the blank.

For the purpose of holding the furnace A erect at other times, when not in registering position for lowering by the plunger, each furnace is provided with a pair of supporting arms or levers 65 carried by rock shaft 66 carried by bearings 67 below the table and operated by a hand lever 68.

Outwardly beyond the turntable, but as close thereto as practicable, is the welding machine B, in radial alinement with each furnace when brought to operative position by rotation of the turntable. At one side of the welding machine is a track 27, and a similar short section of track 28 is laid on the turntable, alongside of each furnace, so as to register with the track 27 as each furnace is brought into position.

For the purpose of supporting the blank C above the furnace, and of moving it therefrom to the welding machine when heated, along such registering tracks, I provide a buggy 29 carried by wheels 30 on said tracks, a separate buggy being provided for each furnace.

The upper framework 31 of the buggy terminates in a sloping supporting face or faces 32 to receive the inclined side of the blank C, of plate metal, and is also provided at its inner opposite edge portion with trunnion sockets 33. The purpose of these is to receive and carry the extended necks or studs 34 of a carrying plate 35, which is temporarily clamped to the blank by clamps 36. By this means, the blank, of the particular form shown, is mounted on the buggy with its overlapping edges 12, 13, maintained in proper relative position to the furnace, and subsequently, to the dies of the welding machine.

The buggy may be moved along the tracks by any suitable means, proper stops being located at each end of the desired movement.

It will also be understood that the blank in some cases may be supported and moved by means of any suitable superimposed mechanism, as a crane, adapted to operate in the same relation to the furnace and machine as the buggy and tracks, for the same purpose as described.

The welding machine B, which is particularly adapted to the welding of the joint of an annealing box or similar article C, is located outwardly beyond the turntable, but as close to it as possible to save time in transporting the blank. The machine, which is generally similar in construction to that of my companion application filed herewith, Serial No. 629,257, filed April 2, 1923, is provided with a pair of co-acting stationary and movable dies 37 and 38, between which the overlapping ends 12—13 of the blank are welded.

Stationary die 37 is mounted along the under side of a supporting horn or anvil block 39, which in turn is mounted at one end portion of the machine by a cross-head 40 upon columns 41 extending upwardly from the main foundation frame 42. Movable die 38 is mounted above the reciprocable cross-head 43 carried up by plungers 44 of hydraulic or other fluid-actuated cylinders 45, by which the cross-head and die are pressed upwardly under the active pressure of the fluid. Cylinders 45 are controlled by the usual three-way regulating valve 46 and supply lines 47, as will be readily understood.

For the purpose of retaining the extended end of anvil block 39 against pressure during the forging operation, it is retained by the cross-bar or bolt 48 of swinging links 49 pivoted to the lower cross-bolt 50. Such retaining double arm member is adapted to be thrown upwardly and downwardly through suitable gearing 51—52 actuated by fluid pressure cylinders 53—54 in one direction or another, as controlled by valve 55 and alternately operated fluid supply lines 56, 57, as more fully described in the application above referred to.

When the blank has been sufficiently heated and carried across tracks 28—27 to bring the heated overlapping edges 12—13 between the dies 37—38, arms 49 are thrown upwardly to holding position, as in Fig. 2, whereupon, pressure is supplied to cylinders 45, effecting upward movement of cross-head 43 and die 38, when the welding operation is effected throughout the full length of the seam.

In such operation, the entire blank is lifted vertically through the range of any necessary lost motion, bearing necks 34 being thrust upwardly from bearings 33, and when the welding operation is completed and die 38 lowered, the original position will be resumed, with the blank resting backwardly against the inclined face 32 of the buggy 29. Thereupon, arms 49 are again thrown down and the buggy is shifted backwardly to its original position on the turntable, resting on sectional tracks 28, when the welded blank may be removed by a crane or other suitable mechanism.

Thereupon, a fresh blank is placed in placed in position upon the buggy, and the overlapping edges 12—13 are properly located over the furnace fire for heating.

As each heated blank is brought around by the turntable into registering position with the welding machine, the operation just described is carried out. In the meantime, each new blank is being successively mounted on the last used buggy, and is being gradually heated as the turntable revolves with the intermittent rest periods.

The heat of each furnace is under the control of the operator by manipulation of damper 16, care being taken to increase the heat as needed, to bring the temperature of the edges to be welded up to the desired degree, the operator also manipulating the fuel of the furnace to bank it up properly at each side, and also utilizing movable sections of refractory material, as bricks, along the inner face of the seam, to assist in retention and radiation of the heat, as is well understood by those skilled in the art.

The furnace A is maintained in its raised position during such heating period by erected arms 65, and after the blank is at the proper temperature and just before shifting the buggy on the tracks toward the welding machine, plunger 23 is raised, the arms 65 are thrown down as in Fig. 9, and its outer end is lowered by release of pressure from cylinder 24. Such lowering of the furnace and the fuel in combustion away from the heated edges avoids disturbance of the fire or of any portion of the furnace by interference with the outward movement of the blank, which can be then quickly shifted over to bring it within range of the dies of the welding machine. The maintenance of the air supply during such manipulation of the furnace is effected through the pipe section 14, or a flexible hose connection may be used for the same purpose.

While the welding machine as shown has given excellent results in practice, and is well adapted to the welding of the particular blank illustrated, for annealing boxes, in which the blank is of plate metal of approximately seven-eighths of an inch in thickness, it will, of course, be understood that any other suitable or adaptable form of welding machine may be utilized, or that the carrying buggy and its parts may be modified or changed to suit any different adaptation of the invention in the manipulation and operation upon blanks or articles of different forms.

It will also be obvious that, in place of the turntable construction, I may utilize a reciprocable framework 58 mounted by wheels 59 on the track 60, and carrying a plurality of similarly constructed and similarly operated furnaces A. Such furnaces are located at intervals along the length of the reciprocable frame or platform 58, as shown, and at each side thereof are the corresponding tracks 28' adapted to register with the track 27' leading alongside of the welding machine B. Each furnace is supplied by a main trunk air supply pipe 14, with branch sections 14ª adapted to furnish air from a blower 61 mounted at one end of the platform and actuated by the driving motor 62, as will be readily understood. The air supply to each furnace is under the control of a damper valve in the same manner already described.

The platform 58 may be propelled along the track and stopped at proper intervals and positions to bring each furnace into registering position with the welding machine, and, for the purpose of such movement, is provided with gearing 63 and motor 64 for actuating one or more of the wheel axles in the ordinary way.

The operation of the mechanism just described is in all other respects generally similar to that utilizing the turntable construction. In either case, the blank is capable of being gradually brought up to the desired temperature and then moved to the welding machine, and operated upon within a minimum of time and with a resulting successful effect as to the welding of the metal. The manipulation of the blank is rendered comparatively easy by means of the apparatus itself which is well adapted to reducing the amount of manual labor as well as the time employed.

The advantages of welding a blank within as short a time as possible after removal from the heat will be understood and appreciated by all those familiar with the art, and the apparatus as a whole is capable of a largely increased capacity as to out-put over previous methods and apparatus heretofore commonly used.

The invention may be variously changed and modified by the skilled mechanic to adapt it to varying conditions of use, different forms of blank, and in various other ways, within the scope of the following claims.

What I claim is:

1. Means for heating metal and then quickly subjecting it to formative treatment consisting of a pressure exerting machine having an upper fixed anvil and a lower vertically moving co-acting die, a portable heating furnace, and means for moving a metal blank from the furnace to a position between the anvil and die whereby it may be raised by the die against the anvil.

2. Means for heating metal and subjecting it to formative treatment consisting of a stationary pressure exerting machine, a portable heating furnace adapted to be brought into alinement with the machine, and means for supporting a metal blank entirely above the furnace and for quickly moving it to operative position with relation to the machine.

3. In heating and welding apparatus, a welding machine, a portable furnace, and a blank carrier adapted to support a blank above the heating furnace and to transport the blank from the furnace to the welding machine while providing for movement of the blank during welding independent of the carrier.

4. In heating and welding apparatus, a welding machine, a portable furnace, and a blank carrier adapted to support a blank in heating position entirely above the furnace and to move it to relatively movable operative position between the acting members of the welding machine.

5. In heating and welding apparatus, a welding machine, a portable furnace, and a blank carrier provided with blank supporting mechanism adapting the location of the blank to heating position above the furnace and to movement therefrom and adaptation independent of the carrier to an operative position relative to the welding machine when said tracks are in register.

6. In combination, a welding machine, a track leading thereto, a movable furnace support provided with a furnace and a connecting track, and a blank carrier movable over said tracks from the furnace to the welding machine.

7. In combination, a welding machine, a track leading thereto, a movable furnace support provided with a furnace and a connecting track, means for locking the furnace support when said tracks are in alinement, and a blank carrier movable over said tracks from the furnace to the welding machine.

8. In combination, a welding machine, a track leading thereto, a movable furnace support provided with a furnace and a connecting track, and a blank carrier movable over said tracks from the furnace to the welding machine, and provided with means for loosely supporting a blank thereon.

9. In combination, a welding machine, a track leading thereto, a movable furnace support provided with a vertically adjustable furnace, a track alongside the furnace and adapted to connect with said track, and a blank carrier movable over said tracks from the furnace to the welding machine.

10. In combination, a welding machine provided with a pair of welding dies and an opening and closing connecting support providing for placement of a blank, a track arranged alongside the welding machine, a movable furnace support provided with a furnace and a connecting track, and a blank carrier movable over said tracks when in registering position having means for supporting a blank in heating relation to the furnace and to move it between the welding dies.

11. In combination, a welding machine, a track leading thereto, a movable furnace support provided with a series of furnaces and connecting track sections, and a blank carrier for each of said furnaces and its track section movable thereover and over the track leading to the welding machine when in registering position.

12. In combination, a welding machine, a track leading thereto, a movable furnace support provided with a series of furnaces and connecting track sections, means for supplying air to each of said furnaces, and a blank carrier for each of said furnaces and its track section movable thereover and over the track leading to the welding machine when in registering position.

13. In combination with a welding machine, a serving turntable provided with a series of radially arranged heating furnaces, and means for moving a blank from a position on the turn-table over one of the furnaces to the welding machine.

14. In combination with a welding machine and a track leading thereto, a serving turntable provided with a series of annularly spaced heating furnaces each having a track adapted to register with said track, and a blank carrier movable over said tracks.

15. In combination with a welding machine and a track leading thereto, a serving turntable provided with a series of annularly spaced heating furnaces each having a track adapted to register with said track, and a serving buggy for each of said furnaces movable over said tracks when in registering position and provided with means for supporting a blank.

16. In combination with a welding machine and a track leading thereto, a serving turntable provided with a series of annularly spaced heating furnaces each having a track adapted to register with said track, and a serving buggy for each of said furnaces movable over said tracks when in registering position and provided with means for loosely supporting a blank whereby it may be gripped by the welding machine and disengaged from said supporting means.

17. In a combination with a welding machine having a horizontally arranged operating space between opposing dies, a buggy having an upper supporting frame provided with open sided socket bearings for supporting and moving a blank along a plane coinciding with the operating space and providing for free upward movement of the blank from said bearings during action of the dies.

18. In combination with a welding machine having a horizontally arranged operating space between opposing dies, a buggy having an inclined surface and oppositely located open sided socket bearings for supporting and moving a blank along a plane coinciding with the operating space and providing for free upward movement of the blank from said bearings during action of the dies.

19. In combination with a welding machine having a horizontally arranged operating space between opposing dies, a normally horizontal vertically adjustable open top heating furnace, and means for supporting a blank thereover and for moving it therefrom along a plane coinciding with the operating space of the welding machine.

20. In combination with a welding machine having a horizontally arranged operating space between opposing dies, a normally horizontal open top heating furnace pivotally mounted at one end and having means for lowering the other end, and means for supporting a blank thereover and for moving it therefrom along a plane coinciding with the operating space of the welding machine.

21. In combination with a welding machine having a horizontally arranged operating space between opposing dies, a normally horizontal open top heating furnace pivotally mounted at one end and having means for supporting, lowering and raising the other end, and means for supporting a blank thereover and for moving it therefrom along a plane coinciding with the operating space of the welding machine.

22. In combination with a welding machine having a horizontally arranged operating space between opposing dies, a normally horizontal open top heating furnace pivotally mounted at one end and having means for supporting, lowering and raising the other end, and having means for supplying air to the fuel of the furnace; means for supporting a blank over the furnace and for moving it therefrom along a plane coinciding with the operating space of the welding machine.

In testimony whereof I hereunto affix my signature.

PERCY E. HUNTER.